March 15, 1966  A. MORSEWICH  3,240,050
GIMBAL MOUNTED SELF-TEST MECHANISM FOR AN ANGULAR RATE GYROSCOPE
Filed Dec. 2, 1963
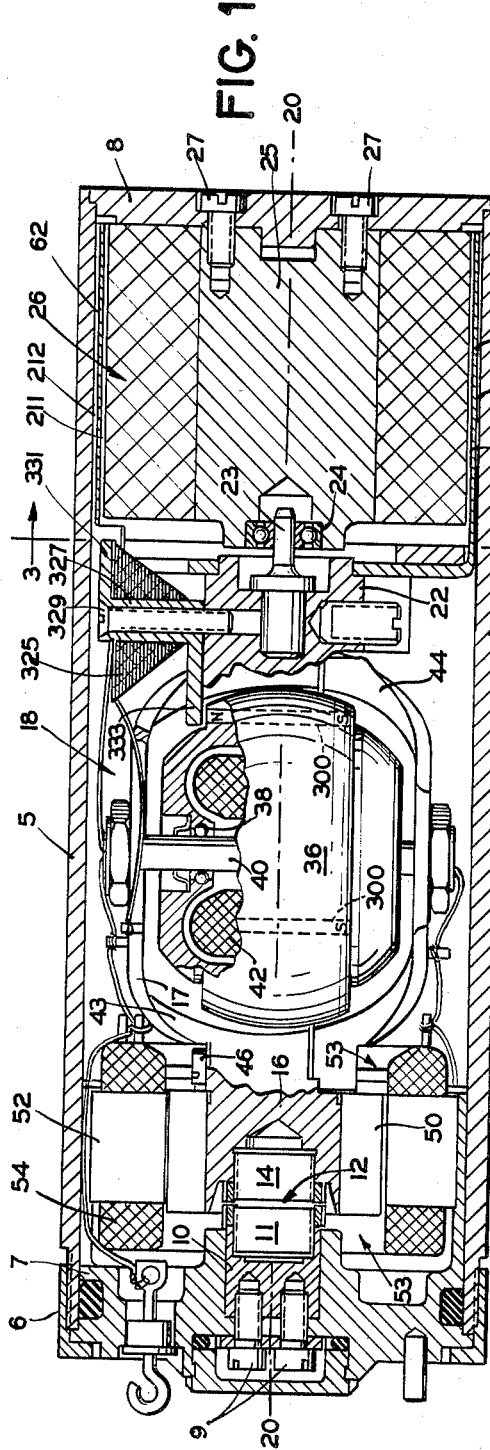
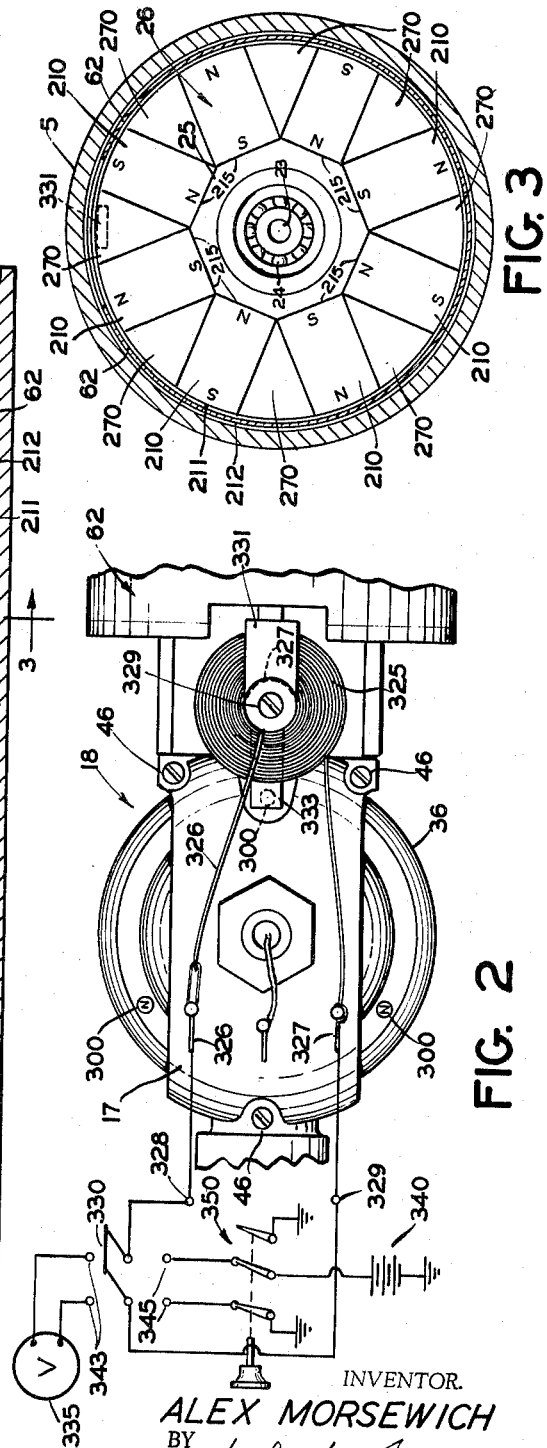
INVENTOR.
ALEX MORSEWICH
BY 
ATTORNEY

United States Patent Office 3,240,050
Patented Mar. 15, 1966

3,240,050
GIMBAL MOUNTED SELF-TEST MECHANISM FOR AN ANGULAR RATE GYROSCOPE
Alex Morsewich, Wayne, N.J., assignor to The Bendix Corporation, Teterboro, N.J., a corporation of Delaware
Filed Dec. 2, 1963, Ser. No. 327,268
7 Claims. (Cl. 73—1)

This invention relates to a self-test mechanism for an angular rate gyroscope and more particularly to a novel means embodied in an angular rate gyroscope to check gimbal freedom, spin motor rotor revolutions per second, and to improvements in a self-test mechanism of a type disclosed and claimed in U.S. application Serial No. 208,998, filed July 11, 1962, by John J. Haring and assigned to The Bendix Corporation.

In a rate gyroscope of the type disclosed in the last-mentioned application, there is provided a self-test mechanism including an electromagnetic winding and core fixedly mounted on the casing of the gyroscope so that risidual magnetism in the core and electromagnetic winding may tend to provide inaccuracies in the operation of the gyroscope gimbal pivotally mounted within the casing.

An object of the invention, therefore, is to provide a novel self-test mechanism operatively arranged to avoid such inaccuracies by mounting the electromagnetic winding and magnetic core directly on the gyroscope gimbal with one end of the core being arranged in cooperative relation with the bar magnets in the rotor of the gyroscope to sense the speed of rotation thereof and the other end of the core being arranged in cooperative relation to the gyroscope damper magnet so as to be effective in applying a torque about the axis of the gyroscope gimbal.

Moreover, in the arrangement of the electromagnetic winding of the self-test mechanism on the angularly positioned gimbal of the gyroscope and within the casing of the gyroscope, a more compact assemblage may be effected than with the electromagnetic winding mounted on the casing of the gyroscope, as disclosed in the copending U.S. application Serial No. 208,998. Therefore, another object of the invention is to provide a compact assemblage of the self-test mechanism within the casing of the gyroscope of simple construction.

Another object of the invention is to provide a novel magnetic core mounted on the gimbal of a rate gyroscope with an arm projecting at right angles from one end of the core and to one side thereof and another arm projecting at right angles from the other end of the core and to the other side thereof with a pancake coil mounted intermediate the arms having the windings thereof arranged spirally in the form of a frustum of a cone with the frustum portion of the cone mounted adjacent the gimbal of the gyroscope to facilitate the compact assemblage thereof and so arranged that one of the arms may be cooperatively arranged in relation to bar magnets mounted in the rotor of the gyroscope so that a pulsating voltage may be induced in the electromagnetic winding in one mode of operation thereof to sense the speed of rotation of the rotor while the other arm may be arranged in cooperative relation to a damper magnet so as to apply a torque to the gimbal about the axis thereof upon a D.C. current being applied to the pancake winding in another mode of operation.

Another object of the invention is to provide a simplified self-test mechanism for an angular rate gyroscope including permanent rod magnets inserted in the rim of the rotor of the gyroscope and arranged in one mode of operation with an electromagnetic winding and core fixedly mounted on a gimbal supporting the gyro rotor to check the speed of rotation of the gyro rotor; and which electromagnetic winding is arranged to cooperate in a second mode of operation with a damper magnet mounted in the casing of the gyroscope upon energization of the electromagnetic winding with a selectively applied direct current resulting in a torque being applied about the axis of the gimbal supporting the gyro rotor so as to check freedom of the gyro gimbal.

Another object of the invention is to provide in such a self-test mechanism, means whereby reversal of the direction of energization of the electromagnetic winding will reverse the torque applied about the axis of the gimbal of the gyroscope and which may be effected in cooperation with a multi-polar damper magnet of a type disclosed and claimed in a U.S. application Serial No. 206,375, filed June 29, 1962, by George O. Ranes, and assigned to The Bendix Corporation.

Another object of the invention is to provide such a self-test mechanism in which in order to check the gyro motor speed as the rotor is rotated thereby, the field produced by the rotation of the permanent rod magnets in the rotor will generate an A.C. voltage in the aforenoted electromagnetic winding mounted on the gimbal supporting the gyro rotor for effecting a voltage therein proportional to the speed at which the rotor is driven by the motor of the gyroscope.

Another object of the invention is to provide novel electromagnetic means carried by the gimbal supporting the gyro rotor and having a pole cooperatively arranged in relation to a multi-polar damper magnet so as to apply a torque about the axis of the gimbal to check freedom of the gyro gimbal.

Another object of the invention is to provide a novel self-test mechanism for an angular rate gyroscope, including means carried by the gimbal supporting the rotor of the gyroscope and alternately operable to check both gimbal freedom and the gyro motor speed of the rate gyoscope.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference is to be had to the appended claims for this purpose.

In the drawings:

FIGURE 1 is a fragmentary side sectional view of a typical angular rate gyroscope assembly embodying the novel self-test mechanism of the invention.

FIGURE 2 is a top plan view of the gyroscope of FIGURE 1 with the casing broken away and illustrating the cooperative relationship of the parts of the novel self-test mechanism including the permanent rod magnets inserted in the gyro rotor and arranged in cooperative relation with the electromagnetic winding and core mounted on the gimbal carrying the gyro rotor and arranged in cooperative relation to the permanent magnet rods in the gyroscope rotor to sense the speed of the rotor and in cooperative relation to a damper magnet to check the freedom of the gyroscope gimbal.

FIGURE 3 is a sectional view of FIGURE 2 taken along the lines 3—3 and looking in the direction of the arrows and illustrating the multi-polar damper magnet and the cooperative relationship therewith of the electromagnetic winding carried by the gyro rotor gimbal.

Referring to the drawing of FIGURE 1, there is illustrated a typical angular rate gyroscope embodying the novel self-test mechanism of the present invention. The angular rate gyroscope may be of a type disclosed and claimed in U.S. Patent No. 3,009,360, granted November 21, 1961, to Alex Morsewich and assigned to The Bendix Corporation. The gyroscope includes a casing 5 of generally cylindrical form of a ferrous magnetic material having attached at one end a cap 6 and mounted within the casing 5 suitable end plates 7 and 8. The end plate 7 having fastened thereto by screws 9 a supporting member 10 in which is secured one portion 11 of a flexural pivot assembly 12 having another portion 14 flexibly movable relative to the portion 11, and angularly movable about a precession axis 20—20. The portion 14 of the flexural pivot assembly 12 is affixed to a shaft 16 projecting from one end of a gimbal 17 of a gyroscope 18, as explained in the aforenoted patent. The flexural pivot assembly 12 may be of a type disclosed and claimed in U.S. Patent No. 3,073,584, granted January 15, 1963, to Henry Troeger, and assigned to The Bendix Corporation.

A second shaft 22 projects from an opposite end of the gimbal 17 and has a pivotal member 23 mounted in bearings 24 supported in an octagonal core 25 of a multi-polar damper magnet 26 secured to the end plate 8 by screws 27.

The gimbal 17 of the gyroscope 18 is disposed in a central portion of the casing 5 and has rotatably mounted therein a gyro rotor member 36 carried by bearings 38 mounted on shafts 40 and driven by a suitable electric motor 42 supported within the gimbal 17. The rotor shafts 40 are supported at opposite ends by split upper and lower sections 43 and 44 of the gimbal 17 secured by screws 46.

Further, mounted on the output shaft 16 is a rotor element 50 arranged in cooperative relation with a stator element 52 of an output signal generator 53 of conventional type. The stator element 52 of the signal generator 53 is affixed to the casing 5 and has suitable stator windings 54 in which may be generated an output signal upon a rotational deflection of the output shaft 16 by the gyro in a clockwise or counterclockwise sense, proportional to the rate of turn of the gyro about the input axis.

Further, secured to the opposite output shaft 22 is a drag cup 62 of suitable material such as copper. The drag cup 62 protrudes into a magnetic flux gap produced by the multi-polar damper magnet 26 mounted in the casing 5 and cooperates therewith so as to dampen the oscillations of the gimbal assembly 17 which is normally supported in a centralized relation by the flexural pivot 12 and pivot member 23.

The multi-polar damper magnet 26, as shown in FIGURE 3, may include an octagonal core 25, of a suitable soft iron or ferro magnetic material having a very low resistance to the flow of the magnetic flux generated by the eight permanent magnets 210 positioned about the core 25 and projecting therefrom.

The multi-polar damper magnet 26 may be of a type disclosed and claimed in U.S. application Serial No. 206,375, filed June 29, 1962, by George O. Ranes, and assigned to The Bendix Corporation, assignee of the present invention, and as explained in the last-mentioned application, the permanent magnetic members 210 are formed of a material having a maximum energy characteristic such as Alnico V or VI, a platinum cobalt material, or an aluminum cobalt material and which material unless oriented in the direction in which the magnetic flux is to flow has a very high resistance to the flow of the magnetic flux compared to that of the soft iron or ferro magnetic material of the core 25.

However, when the permanent magnetic material of the members 210 is oriented in the proper direction, there may be produced a maximum magnetic field and the magnetic flux generated by the permanent magnets 210 flows in a return path adjacent the inner ends thereof through the soft iron or ferror magnetic material of the core 25 while at the outer ends of the adjacent members 210, the magnetic flux flows through the low electrical resistance nonmagnetic material of drag cup 62 and through the ferror magnetic material of the casing 5 as the other return path, as shown schematically by the dotted lines in the drawing of FIGURE 3.

In the aforenoted arrangement, there may be an air gap 211, of for example, .005 of an inch between the ends of the permanent magnets 210 and the drag cup 62 which in turn may have a thickness of, for example, .020 of an inch while there may be a further air gap 212 of, for example, .004 of an inch between the drag cup 62 and the casing 5 of the gyroscope.

There is thus provided a magnetic system so arranged as to effect the highest magnetic flux density for damping oscillations of the drag cup 62. The rate of such damping will depend, of course, on the rate of movement of the cup 62 of a low electrical resistance nonmagnetic material such as copper, silver, or gold, in this very strong magnetic field.

In fabricating the damper magnet of FIGURE 3, the respective permanent magnet member 210 are copper plated at the inner ends 215 thereof and then tinned and seated together on corresponding octagonal surfaces of the core 25, as explained in copending U.S. application Serial No. 206,375.

The assembly is further bonded together with the use of a solder, epoxy resin or other suitable nonmagnetic filler material 270 for filling the spaces between the several permanent magnets 210, as best shown in FIGURE 3, and then as explained in the U.S. application Serial No. 206,375, the assembled damper magnet may be positioned in a suitable charger unit so as to permanently magnetize the respective magnets 210 in opposite directions, as indicated by the letters "N" and "S" in the assembly of FIGURE 3.

In the aforenoted arrangement, it will be seen that by the provision of the soft iron or ferro magnetic core 25 and arrangement of the several permanent magnets 210 in relation thereto, full advantage is taken of the high energy characteristic of the permanent magnets 210 while the very low resistance to the magnetized force of the soft iron or ferror magnetic core 25 is utilized so as to obtain the highest magnetic flux density.

The aforenoted arrangement of the drag cup 62 in relation to the multi-polar damper magnet 26 provides a magnetic damping arrangement of maximum energy characteristics which so cooperates with the drag cup 62 as to effect a torque in opposition to movement of the gyroscope gimbal so as to dampen oscillations of the gyroscope gimbal 17.

*Self-test mechanism*

The novel self-test mechanism forming the subject matter of the present invention and embodied in the aforedescribed structure includes permanent rod magnets indicated by the numeral 300 projecting through the rotor element 36 and formed of a material such as Alnico V or other suitable material having high coercive force and inserted in the rim of the rotor element 36 of the gyroscope formed of a suitable nonmagnetic material.

In the present embodiment of the invention, three permanent magnetized rods, indicated by the numeral 300 are shown in position in equal spaced relation about the rim of the rotor element 36 and along the length of the rotor in parallel relation to the rotor shaft 40. The three permanent magnet rods 300 set up a magnetic field along the length of the rotor 36 one end of which is a North magnetic pole and the other end of which is a South magnetic pole, as shown in FIGURE 1.

There is further provided an electromagnetic winding or pancake coil, indicated by the numeral 325, mounted on a soft iron magnetic core 327 and secured to the shaft 22 of the gimbal 17 by a screw 329, as shown in FIGURES 1 and 2. The pancake coil 325 has the windings thereof arranged spirally in the form of a frustum of a cone with the frustum portion of the cone mounted adjacent the gimbal 22 to facilitate the compact assemblage thereof. The magnetic winding 325 may provide the double function of serving as a torquer or means for applying a torque to the gyro gimbal 17 in that an arm 331 projecting at right angles from one end of the core 327 and to one side thereof is arranged in cooperative relation to the adjacent poles 210 of the multi-polar magnet 26, as indicated by dotted lines in FIGURE 3, upon energization of the electromagnetic winding 35 from a source of D.C. in one mode of operation, while another arm 333 projecting at right angles from an opposite end of the magnetic core 327 and to the other side thereof is arranged in cooperative relation with the permanent magnetic rods 300 so that in another mode of operation upon the motor 42 rotating the rotor 36, the electromagnetic field produced by the magnetic rods 300 generates an alternating current voltage in the electromagnetic coil 325, which voltage will be proportional to the speed of rotation of the member 36.

In addition to the size of the permanent magnets 300 and coil 325, other factors may limit the output. These may include the number of magnets 300 and the relative position thereof to the coil 325. As shown diagrammatically in FIGURE 2, the coil 325 is connected by conductors 326 and 327 to output terminals 328 and 329 which are in turn connected in a control circuit including an operator-operative switch 330. The operator may selectively position the switch 330 so as to close contacts 343 to connect the output of the electromagnetic winding 325 across a voltmeter 335 for indicating the output voltage applied across the electromagnetic winding 325 and thereby the speed of the rotor 336.

Another indication of the speed of rotation of the rotor 336 may be effected by connecting the output of the electromagnetic winding 325 to an oscilloscope and observing the pattern effected thereby. If the output voltage of the electromagnetic winding 325 is placed on the Y axis and the motor excitation voltage is placed on the X axis of the oscilloscope, a Lissajous pattern resembling a circle occurs when the excitation frequency of the gyro motor 22 and the pick-off frequency of the electromagnetic winding 325 are the same.

In an alternate operation of the electromagnetic winding 325, a source of direct current 340 may be selectively applied to the winding 325 by the operator selectively positioning the switch 330 so as to close the contacts 345, as shown in FIGURE 2. When the direct current is thus applied to the coil 325, there is produced a magnetic field which will react with the field produced by the permanent magnets 210 of the damper magnet 26.

The end portion of the arm 331 of the magnetic core 327 is positioned intermediate the magnetic members 210, as indicated in dotted lines in FIGURE 3, so that dependent upon the direction of energization of the electromagnetic winding 325, the arm 331 will be attracted towards the North or South pole of the adjacent members 210 to apply a torque to effect the arcuate movements of the gimbal 17 in a clockwise or counterclockwise direction. This action in turn causes a force resulting in the application of a torque about the output of the axis 20—20 of the gyroscope. The displacement of the gimbal can be noted by the change in the output signal of the gyroscope effected at the output signal generator 53.

Moreover, by reversing the direction of the current flow from the source 340 by the operation of a suitable reversing switch mechanism 350, indicated generally in FIGURE 2, the direction of the torque applied through the electromagnetic winding 325 may be appropriately reversed about the output axis 20—20. From the foregoing, it will be seen that through the novel self-test mechanism herein provided, a direct current may be applied to the electromagnetic winding 325 to produce a force causing the rate gyroscope to be displaced about its output axis 20—20 and that this force may be reversed by reversing the direction of the current flow to effect a displacement about the output axis 20—20 in an opposite sense.

Furthermore, the novel self-test mechanism may be selectively operated so that as the gyro motor 42 rotates the rotor 36, an alternating current voltage may be generated in the electromagnetic coil 325 proportional to the speed thereof. This voltage may in turn be applied to proper measuring instruments for appropriate speed indication. Moreover, through the aforenoted novel arrangement of the electromagnetic winding 325 on the gimbal 17 of the gyroscope, it will be seen that the self-test mechanism of the present invention is contained within the casing 5 of the gyroscope and on the gimbal 17 mounted within the casing 5 and not on the casing 5 of the gyroscope, as in the device of the copending U.S. application Serial No. 208,998.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a gyroscopic device of a type including a gimbal, a rotor member rotatably mounted in the gimbal, motor means carried by the gimbal for driving the rotor member, flexural pivot means for supporting the gimbal relative to a fixed frame, damping means including a drag cup operatively connected to the gimbal and a damper magnet affixed to the frame in cooperative relation with the drag cup to dampen oscillation of the gimbal; the improvement comprising an electromagnetic winding, means for mounting the electromagnetic winding on the gimbal in fixed relation with the damper magnet secured to the fixed frame so as to apply a torque to the gimbal to effect an angular movement of the gimbal about the flexural pivot means relative to the fixed frame, including magnetic means carried by the rotor member, and the mounting means being arranged to secure the electromagnetic winding on the gimbal in cooperative relation with the magnetic means carried by the rotor member so that the said magnetic means may induce an electrical signal in the electromagnetic winding proportional to the speed of rotation of the rotor member by the motor means.

2. The combination defined by claim 1 including control means operable in one sense to cause the electromagnetic winding to apply in cooperative relation with the damper magnet a torque to the gimbal to effect an angular movement of the gimbal about the flexural pivot means supporting the gimbal relative to the fixed frame, and said control means being operated in a second sense to so condition the electromagnetic winding that the said magnetic means effects an output signal in the electromagnetic winding proportional to the speed of rotation of the rotor member.

3. In a gyroscopic device of a type including a gimbal, a rotor member rotatably mounted in the gimbal, motor means carried by the gimbal for driving the rotor member, means including a resilient member for pivotally supporting the gimbal relative to a fixed frame, damping means including a drag cup operatively connected to the gimbal and a damper magnet affixed to the frame in cooperative relation with the drag cup to dampen oscillation of the gimbal; the improvement comprising magnetic means carried by the rotor member, a pancake coil, a magnetic core including means for securing the pancake coil to the gimbal, an arm projecting at right angles from one end of the core and in cooperative relation with the damper magnet, another arm projecting at right angles from the other end of the core and in cooperative relation with the magnetic means carried by the rotor member, operator-operative means to selectively energize the pancake coil in one sense to apply a magnetic force acting in cooperative relation with the damper magnet to apply a torque to the gimbal so as to angularly position the gimbal about the resilient member pivotally supporting the gimbal relative to the frame, and said operator-operative means being operative to selectively connect the pancake coil in another sense so that the magnetic means carried by the rotor member may effectively induce in the pancake coil a signal voltage proportional to the driven speed of the rotor by the motor means.

4. The combination defined by claim 3 in which the pancake coil is positioned on the core between the aforesaid arms and has windings thereof arranged spirally in the form of a frustum of a cone with the frustum portion of the cone positioned adjacent the gimbal.

5. A self-test mechanism for an angular rate gyroscope of a type including a gimbal carrying a rotor adapted to spin about a first axis, said gimbal being pivoted about a second axis normal to said spin axis, a plurality of permanent damper magnets having magnetic poles at their opposite ends mounted on said gimbal and a plurality of permanent rod magnets having magnetic poles at opposite ends and mounted in the periphery of the rotor parallel to said first axis; the improvement comprising an electromagnetic winding mounted on said gimbal and disposed at one side of the rotor, said electromagnetic winding having one end thereof positioned closer to one end pole of said permanent damper magnets than to the other end pole of the magnetic poles of said damper magnets and operable to rotate said gimbal with said permanent damper magnets about said second axis and arranged in cooperative relation with said rod magnets so that there may be induced therein an alternating current with a frequency proportional to the rate of rotation of the rotor member.

6. A self-test mechanism for an angular rate gyroscope of a type including a gimbal, a rotor carried by the gimbal and adapted to spin about a first axis, said gimbal being pivoted about a second axis normal to said spin axis, and a magnet for damping oscillation of the gimbal; the improvement comprising an electromagnetic winding carried by the gimbal, one end of the electromagnetic winding being arranged in cooperative relation with said damping magnet so that upon energization of the electromagnetic winding there may be effected in cooperation with the damping magnet an angular adjustment of the gimbal about the second axis, said rotor including a plurality of permanent bar magnets mounted in the periphery thereof and said electromagnetic winding having another end thereof arranged in cooperative relation with said bar magnets so that in another mode of operation of the electromagnetic winding there may be induced in the electromagnetic winding an alternating current of a frequency proportional to the speed of rotation of the rotor.

7. In combination with a gyroscope of a type including a gimbal, a rotor carried by the gimbal and adapted to rotate about a first axis, and to precess about a second axis of said gimbal, an electromagnetic winding mounted on the gimbal; first magnetic means mounted on the rotor, said first magnetic means being disposed in cooperative inductive relationship to said electromagnetic winding to induce an electrical signal in said winding in accordance with the angular velocity of the rotor about said first axis, second magnetic means mounted on said gimbal and in cooperative relation with said electromagnetic winding mounted on said gimbal, and means for energizing said electromagnetic winding with a direct current so as to cause said electromagnetic winding to cooperate with said second magnetic means to angularly position said gimbal and thereby said rotor about said second axis.

References Cited by the Examiner
UNITED STATES PATENTS 3,074,283 1/1963 Quermann _____ 74—5.5 X
3,077,760 2/1963 Packard _____ 73—1

ISAAC LISANN, *Primary Examiner.*